April 2, 1957 C. D. COCKBURN 2,787,707
PULSE GENERATORS
Filed July 16, 1953
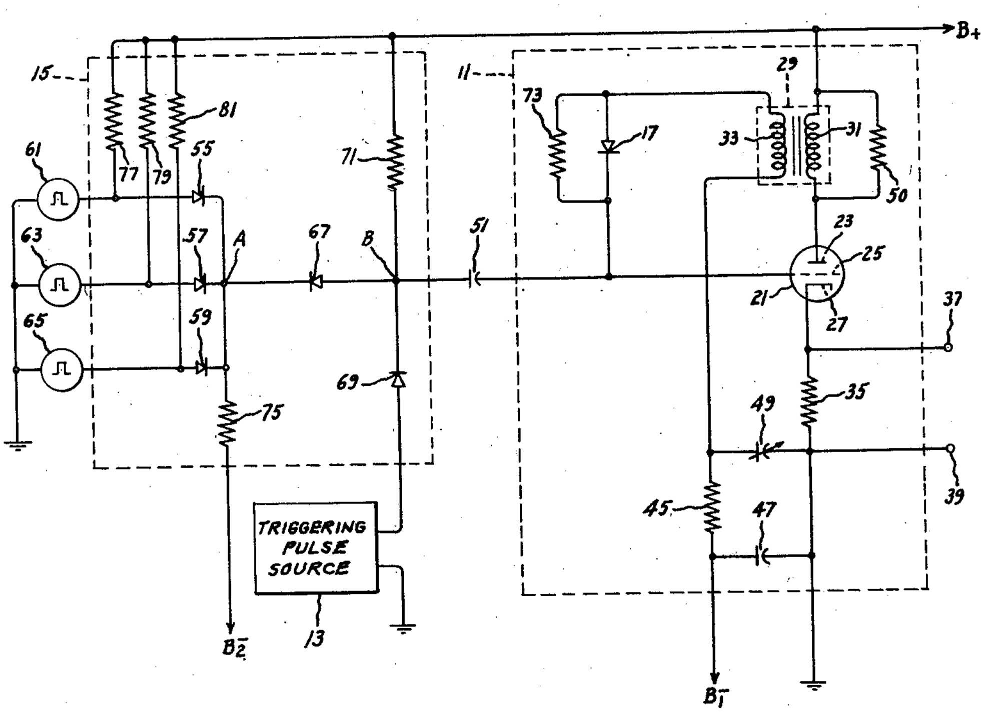
Inventor:
Curtis D. Cockburn,
by Charles M. Hutchins
His Attorney.

United States Patent Office 2,787,707

Patented Apr. 2, 1957

2,787,707

PULSE GENERATORS

Curtis D. Cockburn, Baldwinsville, N. Y., assignor to General Electric Company, a corporation of New York Application June 16, 1953, Serial No. 362,063

5 Claims. (Cl. 250—27)

This invention relates to pulse generator circuits, and more particularly, to pulse generators utilizing blocking oscillators that are triggered by external pulses.

In electrical equipment employing pulse techniques, and in electrical equipment where operation and control are obtained by the switching of potentials, it is sometimes desirable to employ circuits responsive only to the coincidence of voltage pulses on a predetermined number of input lines to energize a common output line. Such circuits are commonly denominated gating circuits. Some types of gating circuits utilize triggered blocking oscillators to generate an output-voltage pulse upon the desired coincidence of input-voltage pulses. A blocking oscillator, however, is a low input-impedance device. Hence, in most blocking-oscillator circuits, triggering pulses must be supplied from a low output-impedance source to obtain maximum efficiency. However, most circuits normally employed as sources of triggering pulses for blocking oscillators have high output impedances. Thus, an impedance-matching stage such as a cathode follower or other device is required between the blocking oscillator and its triggering-pulse source, thereby necessitating extra stages and increasing the cost and complexity of the circuit. One object of the present invention is to provide improved means for matching the impedance of such a blocking oscillator to that of its associated triggering source.

Another problem encountered in such circuits arises from the fact that the gating circuits usually draw unbalanced currents from the pulse sources, and thus may excessively load the sources during conduction of the gating circuits. It is another object of the present invention to provide means for balancing such currents.

Another object of the present invention is to provide means for readily controlling the amplitude of the output-voltage pulses from the blocking oscillator of such a gating circuit.

The invention also has particular utility in electronic computing machines, and has for another important object the provision of new and improved means for detecting pulse coincidence on several input pulse lines and for energizing an output line upon such coincidence.

Briefly stated, a pulse-gating circuit of the present invention includes a blocking oscillator having means coupled to the input thereof for varying the amplitude of the output voltage pulses, and a triggering pulse source connected to the input of the controllable electronic device. Means are also provided to match the output impedance of the triggering-pulse source and the input impedance of the blocking oscillator while not interfering with the normal operation of the blocking oscillator. A gating circuit is connected to the triggering-pulse source to enable the passage of pulses therefrom upon the coincidence of predetermined input voltages and means are provided to balance the current drawn by the gating circuit from its associated gating-pulse sources.

The features of this invention which are believed to be novel are set forth with particularity in the appended claims. The invention itself, however, both as to its organization and method of operation, together with further objects and advantages thereof, may best be understood by reference to the following description when taken in conjunction with the accompanying drawing wherein the single figure is a schematic circuit diagram of a preferred embodiment of the pulse-generating circuit of the present invention.

Referring now to the drawing, a gated triggered blocking-oscillator circuit is shown comprising a blocking oscillator 11 to which is coupled a triggering-pulse source 13. A gating circuit 15 is coupled to the blocking oscillator 11 and the triggering-pulse source 13. Operating voltages for the stages 11, 13, and 15 are supplied from a power supply (not shown) having B+, ground, $B_1-$, and $B_2-$ terminals. Gating circuit 15 enables the passage of a pulse from the triggering-pulse source 13 to the blocking oscillator 11 upon the coincidence of predetermined input voltages to the circuit 15 as will hereinafter be described. In the absence of a triggering pulse, the blocking oscillator 11 is quiescent. However, when a triggering pulse is applied to the input of the blocking oscillator from the source 13, an output pulse results.

In accordance with the present invention, a rectifying means, here shown as a crystal diode 17, is connected in the input circuit of the blocking oscillator 11 to match the output impedance of the triggering-pulse source 13 and the input of the blocking oscillator 11 as will hereinafter be described.

The blocking oscillator 11 includes a controllable electronic device, here shown as an electron discharge device 21 having plate, grid, and cathode electrodes 23, 25, and 27, respectively. Other controllable electronic devices, such as transistors, can be utilized in the place of the electron discharge device 21, necessitating only minor circuit alterations. A feedback transformer 29, comprising coils 31 and 33, is connected to feed back a portion of the output voltage of the device 21 to the input circuit thereof, the coil 31 being connected between the plate 23 and the B+ terminal of the power supply while the coil 33 is connected in the grid circuit of the tube 21. The coils 31 and 33 of the transformer 29 are connected in such polarity as to cause the grid 25 of the device 21 to be driven positive with respect to the cathode 27 when an increase in current flows from the B+ terminal to plate 23 through the coil 31 which, as is known, is necessary to the operation of a blocking oscillator. A cathode output resistor 35 is connected between the cathode 27 and ground, output voltage being derived from terminals 37 and 39. The grid 25 of the tube 21 is normally biased more negative than cutoff by a resistor 45 which is connected between the coil 33 and the $B_1-$ terminal of the power supply. The resistor 45 also isolates the feedback transformer 29 from the bias supply of the $B_1-$ terminal. A capacitor 47 is connected between the resistor 45 and ground for preventing alternating current signals from flowing through the power supply and in conjunction with resistor 45 acts as a filter.

A variable capacitor 49 is connected between the coil 33 and ground to provide a low impedance path for the flow of grid current and for controlling the magnitude of the output voltage pulses, as will hereinafter be described.

As mentioned above, the blocking oscillator 11 is biased below cutoff by the voltage of the $B_1-$ terminal of the power supply. However, when a triggering voltage pulse large enough to bias the grid 25 more positive than cutoff is applied from source 13, current is drawn through the device 21 from the B+ terminal of the power supply. This current passing through the plate coil 31 of the transformer 29 induces a voltage in the grid coil 33. As described above, the coils 31 and 33 are connected in such a polarity to cause the grid 25 to be driven positive with respect to the cathode 27 when current flows through the coil 31 to the plate 23. This positive increment of voltage applied to the grid 25 causes a further increase in plate current, which in turn causes an increase in grid voltage. The device 21 is, therefore, rapidly driven to full conduction by regenerative action. During this process, the grid 25 becomes more positive than the cathode 27 and grid current flows from grid to cathode, returning through the capacitor 49, and as a result of this flow of grid current, the capacitor 49 becomes charged. The circuit remains in full conduction phase for only a very short period of time because the stored energy in the transformer winding causes a reversal of the grid and plate potentials, that is, the second half cycle of an oscillation occurs. As the second-half cycle begins, the grid 25 is driven in a negative direction beyond cutoff and conduction ceases, the accumulated charge on the capacitor 49 preventing further conduction. Losses in the transformer windings and core and in resistor 50 and the arrangement of the windings are such as to assure that the succeeding positive-half cycle does not raise the voltage applied to the grid 25 above the cutoff level, and the oscillations decay. The circuit remains quiescent while the charge on capacitor 49 leaks off through the shunt resistor 45, and the grid potential returns to its initial stage, that is, the stage preceding the input triggering pulse. The circuit is now ready to respond to the next input triggering pulse.

As mentioned above, the unilaterally-conducting diode 17 is connected to the coil 33 of the transformer 29, and is poled to permit passage of the current resulting from the voltage induced in the coil 33 by flow of current through coil 31. Thus the diode 17 does not interfere with the normal flow of regenerative grid current and therefore enables the grid current, and consequently the output current, to reach its maximum value.

Most sources of triggering voltages present a high output impedance to the subsequent circuit. However, a normal blocking oscillator is a low input-impedance device because of the low-impedance transformer coil connected in its grid circuit. Normally therefore, to prevent impedance mismatch, additional circuitry must be connected between the triggering pulse source 13 and the blocking oscillator 11. However, the diode 17 is poled in a direction to present its high reverse impedance to positive input pulses from the source 13. The diode rectifying means 17 thus enables the blocking oscillator input electrode, grid 25, to be coupled to the triggering stage 13 through a coupling capacitor 51.

The gating circuit 15 provides means for enabling the passage of the triggering pulses from stage 13 upon the coincidence of predetermined input pulses. Rectifying means, here shown as unilaterally-conducting diodes 55, 57, and 59 are poled in a direction to enable the passage of positive incoming gating-voltage pulses from sources 61, 63, and 65, respectively. Each of the diodes 55, 57, and 59 has one of its terminals connected to a common point A. A fourth rectifying means, here shown as a crystal diode 67, is connected between the point A and a point B to which one terminal of the coupling capacitor 51 is also connected, the diode 67 being poled in the opposite direction from diodes 55, 57, and 59. A fifth rectifying means, indicated as diode 69 is connected between the point B and the positive terminal of the triggering-pulse source 13, to enable the passage of a positive pulse from the source 13 to the point B when the voltage of the source 13 is greater than the potential at point B. By way of example, the voltage of gating-pulse sources 61, 63, and 65 is assumed to be either 50 or zero volts depending upon whether the sources are conducting or non-conducting. The value of 50 volts is merely assumed by way of example and is not to be considered restrictive in any way whatsoever. Further, by way of example, the voltage of source 13 is assumed to have a positive maximum of 50 volts. Point A will, therefore, be at 50 volts unless all of the sources 61, 63 and 65 are at zero volts in which case point A will also be a zero volts, point B being at the same voltage as point A provided the system has reached equilibrium. If the points A and B are 50 volts, diode 69 will be biased so that a pulse from the source 13 cannot pass. However, if points A and B are at zero volts a positive pulse of 50 volts from source 13 can appear at both points A and B. Thus, the gating circuit 15 will enable the passage of a pulse from source 13 only when all three gating-pulse sources 61, 63, and 65 are at zero volts. In this condition, a positive pulse appears at point B and is coupled through the capacitor 51 to the grid 25 of the tube 21 and, as previously described, causes regenerative action in the tube 21 which results in an output voltage pulse at terminals 37 and 39. As described above, triggering pulses from source 13 are developed across the back resistance of the diode 17, and thus the high output impedance of the source 13 is matched to the input impedance of tube 25.

Resistors 71 and 73 are connected between B+ and the point B, and across the diode 17, respectively, to permit capacitor 51 to charge when the gate voltage changes from zero to 50, while a resistor 75, connected between point A and $B_2^-$, provides a discharge path for the voltage on capacitor 51 when the gate voltage changes from 50 volts to zero volts. The resistors 71 and 75 are connected to high positive and negative voltages, respectively. This enables the capacitor 51 to charge and discharge with a nearly constant current and thus charge and discharge in the shortest possible time for given amplitude of current. This operation is desirable because the charging current for the capacitor 51 flows through the resistor 73 in such a direction as to make the grid 25 of the tube 21 positive and if this current were allowed to become too large the tube 21 would receive an extraneous input pulse and would thus yield a spurious output voltage pulse.

Resistors 77, 79, and 81, are connected between the B+ terminal of the power supply and the ungrounded terminals of the gating-pulse sources 61, 63, and 65, respectively, to permit steady unidirectional current to flow through the gating-pulse sources to ground. The value of this current is equal to one-half of the peak pulse current that flows from each source 61, 63 and 65 through the resistor 75 to $B_2^-$. Thus, for a continuously oscillating square wave, the average value of the current flowing through the gating-pulse sources is zero and the change in current from zero in either direction is only one-half the change that would be present if the resistors 77, 79, and 81, were not utilized. Excess loading of the sources 61, 63, and 65 is also prevented.

While the present invention has been described by reference to a particular embodiment thereof, it will be understood that numerous modifications may be made by those skilled in the art without actually departing from the true spirit and scope of the invention.

What I claim as new and desire to secure by Letters Patent of the United States is:

1. A pulse generator including a vacuum tube having plate, grid, and cathode electrodes, a feedback transformer having plate and grid windings, a source of operating voltage having negative and positive terminals, means for connecting the plate winding of said transformer between said plate and said positive terminal, unilaterally conducting means conductively connected between one terminal of said grid winding of said transformer and said grid, and an adjustable capacitor connected between the other terminal of said grid winding and said negative terminal.

2. A triggered blocking oscillator comprising an amplifying device having plate, grid, and cathode electrodes, means for supplying operating voltages for said electrodes, a feedback transformer connected between said plate and said grid for feeding back a portion of the plate voltage of said device to said grid in regenerative phase, and rectifying means conductively connected between said grid and said transformer and poled in the direction of the current established by said feedback voltage.

3. A gated triggered blocking oscillator comprising an amplifying device having plate, grid, and cathode electrodes, means for supplying operating voltages for said electrodes, a feedback transformer connected between said plate and said grid for feeding back a portion of the plate voltage of said blocking oscillator to said grid in regenerative phase, rectifying means conductively connected between said grid and said transformer and poled in the direction of current established by said feedback voltage, an adjustable capacitor connected to said transformer for adjusting the magnitude of said output voltage, a source of triggering voltage, means for coupling said source of triggering voltage to said grid, and gating means coupled to said grid to enable the passage of triggering voltage from said triggering-voltage source to said grid upon the existence of predetermined conditions.

4. A triggered blocking oscillator comprising a vacuum tube having a plate, a grid, and a cathode, means establishing the operating voltages for said tube and including means for biasing said grid past cutoff, said oscillator being adapted to be triggered on by positive going pulses coupled to said grid, a feedback transformer having a plate coil connected to said plate and a grid coil adapted to be connected to said grid, said feedback transformer being phased to regeneratively feed back a portion of the plate voltage of said tube to the grid thereof, and unilaterally conducting means conductively connected in series with said grid coil and said grid, poled in a direction to enable the passage of the current established by said feedback voltage to said grid and to present a high impedance to applied pulses.

5. A gated triggered blocking oscillator comprising a vacuum tube having plate, grid, and cathode electrodes; a source of operating voltages for said tube having positive, grounded, low-negative, and high-negative terminals; a cathode resistor connected between said cathode and ground; a feedback transformer having first and second coils; means for connecting said feedback transformer between said plate and said grid to regeneratively feed a portion of the plate voltage back to said grid and including means connecting said first coil of said feedback transformer between said positive terminal and said plate, a blocking resistor for connecting one terminal of said second coil to said low-negative terminal, and unilateral conducting means conductively connected between the other terminal of said second coil and said grid and poled in a direction to enable the passage of the current established by said regenerative feedback voltage; a bypass resistor connected in parallel with said unilateral conducting means; a first capacitor connected between said low-negative terminal and ground for preventing alternating current signals from flowing through said low-negative terminal; an adjustable capacitor connected from a point between said blocking resistor and said second coil to ground; a source of triggering pulses; means for coupling triggering pulses from said triggering-pulse source to said grid; rectifying means connected between said triggering-pulse source and said grid; three gating-pulse sources each having a grounded terminal, three diodes each having one terminal thereof connected to a common point, the other terminal thereof being connected to a gating pulse source, a gating diode connected between said common point and said triggering-pulse coupling means, and a resistor connected between each of said gating pulse sources and said positive terminal to provide compensation for current drawn through said diodes.

References Cited in the file of this patent

UNITED STATES PATENTS

| | | |
|---|---|---|
| 2,358,297 | Bedford | Sept. 19, 1944 |
| 2,358,448 | Earp | Sept. 19, 1944 |
| 2,431,766 | Miller et al. | Dec. 2, 1947 |
| 2,509,761 | Crooker | May 30, 1950 |
| 2,527,462 | Spooner | Oct. 24, 1950 |
| 2,557,729 | Eckert | June 19, 1951 |
| 2,562,941 | Parker | Aug. 7, 1951 |
| 2,573,284 | Shaw | Oct. 30, 1951 |
| 2,582,697 | Hepp | Jan. 15, 1952 |
| 2,599,964 | Woodbury | June 10, 1952 |
| 2,623,178 | Seur et al. | Dec. 23, 1952 |
| 2,633,530 | Wachtell | Mar. 31, 1953 |
| 2,677,059 | Pike et al. | Apr. 27, 1954 |